(12) United States Patent
Cooper (10) Patent No.: US 10,110,434 B2
(45) Date of Patent: Oct. 23, 2018

(54) CLOUD ORCHESTRATED CLOUD CONNECTOR UPGRADES

(71) Applicant: Cisco Technology, Inc., San Jose, CA (US)

(72) Inventor: Andrew John Cooper, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 370 days.

(21) Appl. No.: 14/955,329

(22) Filed: Dec. 1, 2015

(65) Prior Publication Data

US 2017/0155550 A1 Jun. 1, 2017

(51) Int. Cl.
*G06F 15/16* (2006.01)
*H04L 12/24* (2006.01)
*H04L 29/08* (2006.01)

(52) U.S. Cl.
CPC ............ *H04L 41/082* (2013.01); *H04L 67/06* (2013.01)

(58) Field of Classification Search
USPC ........................................................ 709/217
See application file for complete search history.

(56) References Cited

U.S. PATENT DOCUMENTS

| 7,743,155 | B2* | 6/2010 | Pisharody | H04L 29/12783 709/217 |
|---|---|---|---|---|
| 7,814,481 | B1 | 12/2010 | Welder et al. | |
| 8,356,296 | B1 | 1/2013 | Welder et al. | |
| 8,589,904 | B2 | 11/2013 | Powell et al. | |
| 8,762,512 | B1* | 6/2014 | Sundaram | G06F 21/6218 709/223 |
| 8,782,632 | B1* | 7/2014 | Chigurapati | G06F 8/65 717/168 |
| 9,104,858 | B1* | 8/2015 | Sundaram | G06F 21/6218 |
| 9,185,562 | B2* | 11/2015 | Reddy | H04W 12/08 |
| 9,241,059 | B2* | 1/2016 | Scott | H04M 1/72519 |
| 9,288,231 | B2* | 3/2016 | Reddy | H04L 63/10 |
| 9,329,894 | B2* | 5/2016 | Raghu | G06F 9/4856 |

(Continued)

OTHER PUBLICATIONS

Sriram Subramanian, "Migrating from 0.7 to 0.8", Apache Kafka, Apache Software Foundation, https://cwiki.apache.org/confluence/display/KAFKA/Migrating+from+0.7 . . . , Apr. 26, 2013, 3 pages.

(Continued)

*Primary Examiner* — Alicia Baturay
(74) *Attorney, Agent, or Firm* — Edell, Shapiro & Finnan, LLC (57) ABSTRACT

Presented herein are techniques for orchestrating an update of an on-premises cloud connector from a cloud-based software platform. In particular, a first version of a first cloud connector is running in an active-active configuration across first and second nodes in an on-premises cluster. The first cloud connector is associated with user subscriptions to a first on-premises application and the first cloud connector connects the first on-premises application to a first cloud service hosted at a cloud-based software platform application. The first cloud connector is updated from the first version to a second version on each of the first and second nodes in a sequential manner. The update of the first cloud connector from the first version to the second version is initiated at the cloud-based software platform.

21 Claims, 6 Drawing Sheets

(56) References Cited

U.S. PATENT DOCUMENTS

| | | | | |
|---|---|---|---|---|
| 9,389,892 | B2* | 7/2016 | Ben Or | G06F 9/45533 |
| 9,436,717 | B2* | 9/2016 | Tyagi | G06F 17/30312 |
| 9,628,471 | B1* | 4/2017 | Sundaram | H04L 63/083 |
| 9,652,472 | B2* | 5/2017 | Tsai | G06F 17/30221 |
| 9,715,507 | B2* | 7/2017 | Brand | G06F 17/30194 |
| 9,727,445 | B2* | 8/2017 | Simernitski | G06F 11/3664 |
| 9,736,252 | B2* | 8/2017 | Ferris | H04W 4/003 |
| 9,825,949 | B2* | 11/2017 | Asenjo | H04L 63/0876 |
| 9,838,476 | B2* | 12/2017 | Maturana | H04L 67/1097 |
| 9,843,505 | B2* | 12/2017 | Reddy | H04L 45/38 |
| 2013/0007772 | A1* | 1/2013 | Arcudi | G06F 11/368 |
| | | | | 719/320 |
| 2015/0212532 | A1* | 7/2015 | Hsu | G05B 15/02 |
| | | | | 700/14 |
| 2016/0029085 | A1* | 1/2016 | Mountain | H04N 21/4583 |
| | | | | 725/43 |
| 2017/0123787 | A1* | 5/2017 | Burkhardt | G06F 8/66 |
| 2017/0153885 | A1* | 6/2017 | Regan | H04L 67/34 |

OTHER PUBLICATIONS

"Software Upgrade Processes Supported by Cisco ASR 1000 Series Routers", Cisco ASR 1000 Series Aggregation Services Routers Software Configuration Guide, OL-16506-17, Chapter 5, May 22, 2015, pp. 5-1 to 5-84.

"Software Upgrade Processes Supported by Cisco ASR 1000 Series Routers", Cisco ASR 1000 Series Aggregation Services Routers Software Configuration Guide, OL-16506-17, Chapter 5, May 22, 2015, pp. 5-85 to 5-167.

"Software Upgrade Processes Supported by Cisco ASR 1000 Series Routers", Cisco ASR 1000 Series Aggregation Services Routers Software Configuration Guide, OL-16506-17, Chapter 5, May 22, 2015, pp. 5-168 to 5-252.

"Windows Update Explained", Microsoft.com, Sep. 2008, 12 pages.

* cited by examiner

CLOUD ORCHESTRATED CLOUD CONNECTOR UPGRADES

TECHNICAL FIELD

The present disclosure relates to cloud connector upgrades.

BACKGROUND

Enterprises are increasingly relying upon cloud applications/services to perform various enterprise functions. The use of cloud services requires on-premises applications/services to connect to the cloud services and places unique demands on the enterprise networks. In order to meet these unique demands, network administrators are turning to the use of cloud extensions/connectors to connect the on-premises applications to the cloud services. A cloud extension or cloud connector is a software component that runs as an on-premises agent on the entity-side and acts as an interface between the on-premises applications and the cloud services.

DESCRIPTION OF EXAMPLE EMBODIMENTS

Overview

Presented herein are techniques for orchestrating an update of an on-premises cloud connector from a cloud-based software platform. In particular, a first version of a first cloud connector is running in an active-active configuration across first and second nodes in an on-premises cluster. The first cloud connector is associated with user subscriptions to a first on-premises application and the first cloud connector connects the first on-premises application to a first cloud service hosted at a cloud-based software platform application. The first cloud connector is updated from the first version to a second version on each of the first and second nodes in a sequential manner. The update of the first cloud connector from the first version to the second version is initiated at the cloud-based software platform.

Example Embodiments

Figure 1:
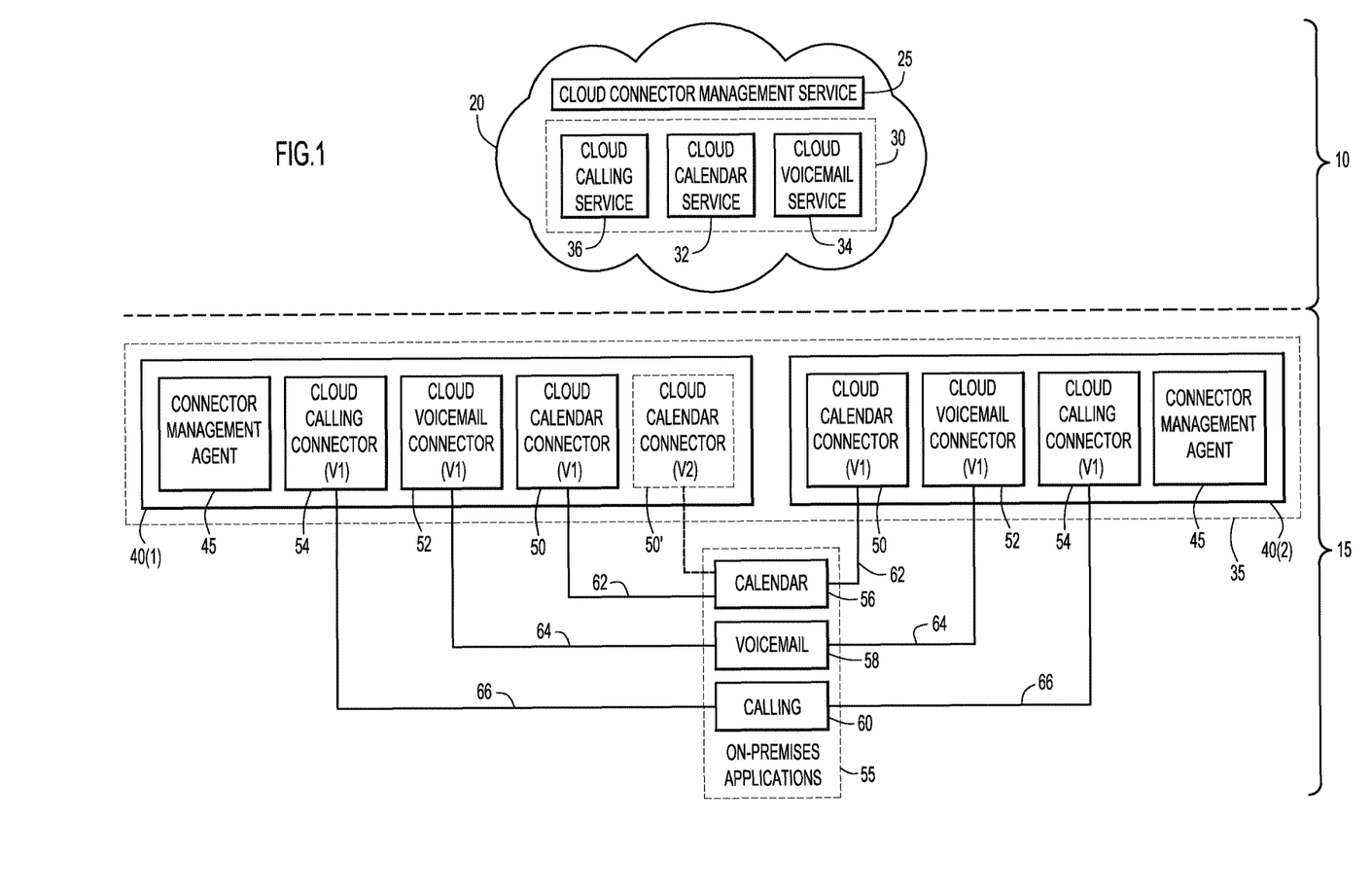
FIG. 1 is block diagram illustrating an arrangement configured to implement cloud-orchestrated upgrade techniques for a cloud connector, according to an example embodiment.

FIG. 1 is a block diagram illustrating an arrangement configured to implement cloud-orchestrated upgrade techniques for cloud connector/extension software components, sometimes referred to simply herein as cloud connectors or cloud extensions, in accordance with examples presented herein. FIG. 1 illustrates a cloud environment 10 and an on-premises environment 15. The cloud environment 10 comprises a cloud-based software platform (cloud) 20 that includes a cloud connector management application/service 25 and one or more cloud applications/services 30. In the specific example of FIG. 1, the cloud services 30 include a cloud calendar service 32, a cloud voicemail service 34, and a cloud calling service 36. However, it is to be appreciated that the presence of the calendar service 32, the cloud voicemail service 34, and the cloud calling service 36 is merely illustrative and that other cloud services or other combinations of one or more services may be present in alternative arrangements.

The on-premises environment 15 includes a cluster 35 of nodes associated with an enterprise computing network. The example cluster 35 of FIG. 1 includes two (2) nodes identified as node 40(1) and 40(2). The nodes 40(1) and 40(2) are physical or virtual machines located on a customer premises. The nodes 40(1) and 40(2) may be implemented as part of computing or networking platforms (e.g., servers, routers, etc.). The presence of two nodes is merely illustrative and other arrangements may include a greater number of nodes within cluster 35.

As shown, each of the nodes 40(1) and 40(2) includes a connector management agent 45 and a plurality of different "types" of cloud connectors, where each type of cloud connector operates separately from the other types of cloud connector. In the example of FIG. 1, the nodes 40(1) and 40(2) each include a cloud calendar connector 50, a cloud voicemail connector 52, and a cloud calling connector 54. Each type of cloud connector 50, 52, and 54 is responsible for certain functional operations and, as such, each type of cloud connector is associated with one or more on-premises applications/services 55. FIG. 1 illustrates an example in which the on-premises applications 55 include a calendar application 56 (calendar), a voicemail application 58 (voicemail), and a calling application 60 (calling). In operation, the cloud calendar connector 50 connects user instances of the on-premises calendar 56 to the cloud calendar service 32, the cloud voicemail connector 52 connects user instances of the on-premises voicemail 58 to the cloud voicemail service 34, and the cloud calling connector 54 connects user instances of the on-premises calling 60 to the cloud calling service 36.

In general, the cloud connectors 50, 52, and 54 are designed to bridge the enterprise's cloud users with its on-premises infrastructure. The cloud connectors 50, 52, and 54 subscribe to notifications from the on-premises applications 56, 58, and 60, respectively, upon direction from the cloud services 32, 34, and 36. The cloud connectors 50, 52, and 54 are then configured to act upon notifications received from the on-premises applications. For example, cloud calendar connector 50 may subscribe to notifications from on-premises calendar application 56, and upon receiving notification of a meeting creation or update, the cloud connector 50 can use that notification to request that the cloud calendar service 32 perform some operation utilizing the notification data. In a further example, a cloud user may need access to an on-premises application from an enterprise's cloud mobile application. In such an example, a cloud connector will receive a request from a cloud service and subscribe user(s) for selected notifications. Notifications from the on-premises application for this user are then routed from the cloud connector up to the cloud service and then onto the cloud mobile application.

In the example of FIG. 1, the cloud connectors 50, 52, and 54 operate as a bridge between the on-premises applications 56, 58, and 60 and the cloud services 32, 34, and 36, thereby providing a secure link. That is, the connectors 50, 52, and 54 perform a "bridging" function such that they allow information to flow from the on-premises services to the cloud, and allow cloud operations to extend down to the premises. As a concrete example, a calendar connector can be notified of a meeting update. The calendar connector can then take that information and update a schedule in the cloud, update a conversation in the cloud, etc. In the reverse direction, the connector can detect keywords in the meeting invite metadata and, as a result, add text about meeting join information to the meeting, thereby resulting in the end-user being able to see information in the calendar entry for joining the meeting via telepresence or other technology.

The connector management agents 45 are on-premises software components that run on the nodes 40(1) and 40(2) to, for example, install the corresponding cloud connectors 50, generate reports to the cloud 20, etc. The cloud connector management service 25 is a software component that communicates with the connector management agents 45. The cloud connector management service 25 orchestrates, sequences, and otherwise manages on-premises installs, upgrades, etc. of the cloud connectors 50, 52, and 54 via the corresponding connector management agents 45.

As described above, FIG. 1 illustrates an arrangement in which there are multiple on-premises nodes (i.e., nodes 40(1) and 40(2)) running the same connector types simultaneously. In other words, nodes 40(1) and 40(2) simultaneously run the cloud calendar connector 50, the cloud voicemail connector 52, and the cloud calling connector 54. In accordance with examples presented herein, each of the cloud connectors 50, 52, and 54 operate in a paired active-active configuration across the nodes 40(1) and 40(2). That is, in the case where a cloud connector services user subscriptions, each user is assigned to two connectors of the same type for on-premises servicing (each connector running on a different premises node). In the active-active configuration of connectors 50, 52, and 54 across nodes 40(1) and 40(2), both instances of a connector type can act upon a received request. As such, if one instance fails, the second instance can continue servicing requests.

More specifically, in the paired active-active configuration, both of the connector instances simultaneously service and send requests to their corresponding services in the cloud. The connector instances do not have knowledge that there is another connector servicing the same subscriber/user. A cloud service, such as cloud calendar service 32, is responsible for de-duplicating the events coming from the connectors. In other words, the cloud calendar service 32 is responsible for ensuring that any operations that perform state transitions of any kind (be it data updates or something else) are idempotent.

Multiple on-premises nodes may run the same connector types simultaneously using different mechanisms. Merely for ease of illustration, further details of the techniques presented herein are described with reference to the use of the paired active-active configuration. However, it is to be appreciated that the techniques presented herein may be used in other arrangements where a subscription (or user) is active at a connector on two nodes at the same time.

As shown in FIG. 1, a first user (user 1) is subscribed to the on-premises calendar application 56, which is connected to cloud calendar service 32 via an instance of the cloud calendar connector 50 running on node 40(1) and an instance of the cloud calendar connector 50 running on node 40(2). These parallel connections are represented in FIG. 1 by lines 62. Similarly, the first user is subscribed to the on-premises voicemail application 58, which is connected to the cloud voicemail service 34 via an instance of the cloud voicemail connector 52 running on node 40(1) and an instance of the cloud voicemail connector 52 running on node 40(2). These parallel connections are represented in FIG. 1 by lines 64. Additionally, the first user is subscribed to the on-premises calling application 60, which is connected to cloud calling service 36 via an instance of the cloud calling connector 54 running on node 40(1) and an instance of the cloud calling connector 54 running on node 40(2). For ease of illustration, connections between the cloud connectors and the cloud services have been omitted from FIG. 1.

In cloud-based software platforms, such as cloud 20, updates/upgrades to the cloud services 30 occur frequently to, for example, improve performance, correct security issues, etc. In the context of hybrid services (i.e., those services where there is a component that is deployed on-premises that communicates with a cloud-based component), there is a need to ensure that the on-premises components are kept up-to-date with the latest versions to ensure continued compatibility with the continuously evolving cloud services, to resolve critical bugs and security flaws, and so on.

Cloud software is generally stateless and can add/remove servers as required. However, since cloud connectors extend the cloud services into the on-premises environment, the cloud connectors are typically stateful (i.e., must keep track of user subscriptions to services) and any subscriptions managed/services thereby must be migrated as part of upgrade. Additionally, at any given time, there may be active subscriptions that need to be serviced (i.e., the cloud connectors may be in use by the on-premises applications). Therefore, presented herein are techniques for updating/upgrading the on-premises cloud connectors in a manner that has zero operational impact on the cloud connectors (i.e., enables continuous management of cloud subscriptions associated with the on-premises applications). The techniques presented herein use an active-active configuration to transparently update the cloud connectors under the control of the cloud platform.

As described further below, unlike conventional arrangements where the upgrades are initiated by a local administrator after manually downloading an updated ISO, OVA or equivalent, the seamless migration of state during the upgrade in accordance with the techniques presented herein enables the upgrade to be initiated and orchestrated (i.e., controlled/managed) by the cloud-based software platform. As such, the upgrade techniques presented herein are sometimes referred to herein as cloud-orchestrated upgrade techniques. Also as described below, the cloud-orchestrated upgrade techniques provide a rollback capability to the last known good configuration in the event of an upgrade failure.

For ease of illustration, the cloud-orchestrated upgrade techniques are described herein with reference to the upgrade of a single cloud connector type at a single node, namely cloud calendar connector 50 at node 40(1). It is to be appreciated that the cloud-orchestrated upgrade techniques may also be used to upgrade other types of cloud connectors and/or different nodes. The different connector types operate as independent entities. As such, the different connector types can be updated simultaneously within the same cluster, providing a generalized upgrade capability for upgrading different software packages within a host.

In the example of FIG. 1, the cloud calendar connectors 50 are each a first version, referred to as version 1 (V1), of the cloud connector software component that is initially installed on each of the nodes 40(1) and 40(2). Initially, the cloud calendar connectors 50 are used for some period of time to manage users' subscriptions to on-premises calendar application 56 which connects to cloud calendar service 32. However, at some later time, the cloud calendar service 32 is updated/upgraded, thereby necessitating an upgrade of the cloud calendar connectors 50 from the current version (version) to a second version, referred to as version 2 (V2). For ease of illustration, the updated version of the cloud calendar connector software component is generally referred to as cloud calendar connector 50'.

Figure 2:
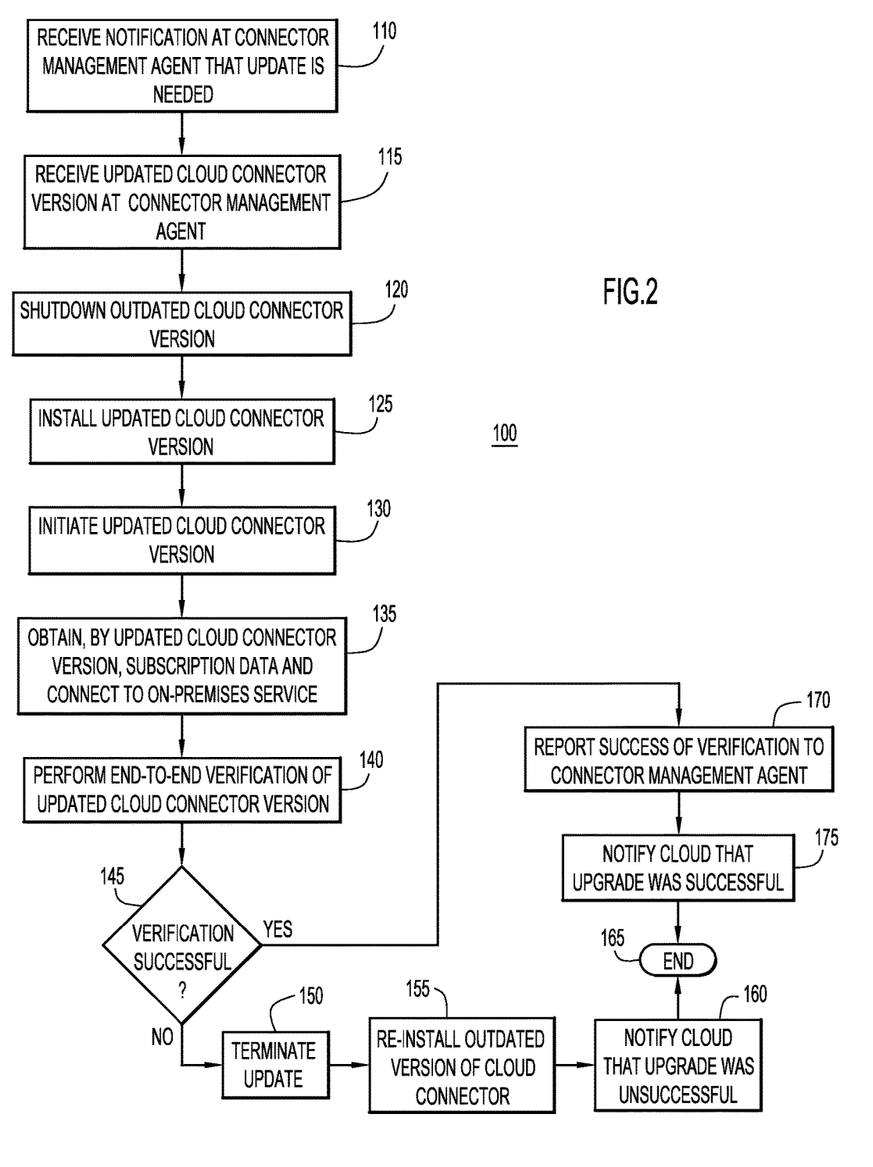
FIG. 2 is a flowchart illustrating a method for performing cloud-orchestrated upgrade techniques for a cloud connector, according to an example embodiment.

FIG. 2 is a detailed flowchart of a method 100 in which the cloud-orchestrated upgrade techniques in accordance with examples presented herein are used to upgrade the first node 40(1) from the current version (version 1) of the cloud calendar connector software component to an updated version (version 2) of the cloud calendar connector software component (i.e., upgrade from cloud calendar connector 50 to cloud calendar connector 50'). Version 2 of the cloud calendar connector (i.e., cloud calendar connector 50') becomes available in the cloud repository and the cloud connector management service 25 is notified that this new version of the calendar connector is available for a specified premises cluster (i.e., cluster 35).

When the upgrade is initiated, the cloud connector management service 25 executes method 100 shown in FIG. 2 for each node in cluster 35. The cloud connector management service 25 sequentially elects each node 40(1) and 40(2) for the upgrade process. The upgrade may be initiated from the cloud 20 as a result of manual administrative intervention at the cloud, automatically initiated at a scheduled time by the cloud connector management service 25 (i.e., a scheduled upgrade), etc.

Although the upgrade may be initiated in different manners, the upgrade is orchestrated, controlled, and otherwise managed by cloud 20. In general, since there is zero-downtime of the cloud connector software, the enterprise and/or the on-premises administrators need not be made aware that an upgrade is occurring or scheduled to occur.

Method 100 begins at 110 where the connector management agent 45 on node 40(1) receives a notification that an update to the cloud connector 50 is required. At 115, the updated version of the cloud connector (i.e., cloud connector 50') is received at the connector management agent 45.

In one example, connector management agent 45 periodically sends a heartbeat message (e.g., a Hypertext Transfer Protocol (HTTP) POST request) to cloud connector management service 25 (e.g., every 30 seconds). Upon receipt of a heartbeat message, the cloud connector management service 25 sends a response (e.g., a POST response) that includes information indicating a version of the cloud connector that node 40(1) should be running The connector management agent 45 compares an actual version of the cloud connector running on the node 40(1) against the version advertised in the in POST response. If there is a difference, the connector management agent 25 will use an HTTPS link in the POST response to download a new version of the connector from a repository in the cloud 20. The cloud repository is not shown in FIG. 1. In alternative examples, the above heartbeat mechanism using HTTP may be replaced with WebSockets or other communication mechanism.

At 120, the outdated version of the calendar cloud connector (i.e., cloud connector 50) is deactivated (i.e., shut down and uninstalled) at node 40(1). As noted above, since the cloud calendar connector 50 runs in an active-active configuration across nodes 40(1) and 40(2), the cloud calendar connector 50 at node 40(2) continues to service the subscriptions for the calendar application 56 (i.e., service the first user's cloud calendar service subscriptions).

In general, a cloud service randomly selects an instances of a cloud connector to which sends a request. That is, the cloud service will select one of the available and online connectors at random and send the request to that connector. If, after a certain period, there has been no response from the connector to which a request was sent, then the cloud service will mark that cloud connector as "offline" and send the request to the second connector. However, in the case of an upgrade, when connector 50 on node 40(1) is shut down it notifies the cloud service that it is going down for an upgrade. As such, the cloud service is aware that connector 50 on node 40(1) is not an available connector instances and it will not be selected by the cloud service as the target of a request. Instead, all requests will go to connector 50 on node 40(2).

At 125, connector management agent 45 installs cloud calendar connector 50' on the node 40(1) and, at 130, cloud calendar connector 50' is initiated/started. At 135, the cloud calendar connector 50' obtains data for users subscriptions to the calendar application 56, which connects to the cloud calendar service 32 via the cloud connector 50. In other words, the cloud calendar connector 50' obtains data for users subscriptions associated with (serviced by) the cloud calendar connector 50'. The subscription data may be obtained, for example, from the connector management agent 45 or the cloud connector management service 25. Also at 135, the cloud connector 50' connects with the on-premises application 56.

In general, a cloud connector "connects" to an on-premises application by using a computing protocol to initiate an ongoing dialog between the cloud connector and the on-premises application (e.g., the connector receives a flow of events signifying changes or updates of some description). Depending on, for example, the actual on-premises application, a cloud connector can "connect" to an on-premises application in a number of manners. In the case of a calendar connection, the cloud connector will open a Transmission Control Protocol (TCP) connection to the Exchange Client Access Service (CAS) server. In a subsequent subscription phase, the cloud connector will subscribe to streaming updates via the Exchange Web Services (EWS) application programming interface (API), which means that it maintains an open TCP socket connection. It is to be appreciated that the use of TCP is merely one example. For example, future implementations for different on-premises applications may use the User Datagram Protocol (UDP) or another protocol instead of TCP.

At 140, after cloud calendar connector 50' starts up, this updated version of the cloud calendar connector software component performs an end-to-end verification of itself. As noted above, the cloud calendar connector operates with both the cloud 20 and the on-premises calendar application 56. Therefore, end-to-end verification means that the cloud calendar connector 50' has confirmed that it can communicate with both the cloud 20 and the on-premises calendar application 56 (i.e., tests the cloud connection and the local connection). At 145, the cloud calendar connector 50' determines if the end-to-end verification was successful.

In certain examples, the end-to-end verification involves a message from the cloud connector 50' to the cloud calendar service 32 indicating the new cloud connector has initialized and is ready to accept subscriptions. This verification implies that the connector has tested that it can successfully connect to the on-premises application and to the cloud service.

If the end-to-end verification was unsuccessful, then the upgrade to cloud calendar connector 50' is terminated at 150. Unsuccessful end-to-end verification can be identified by a time-out (i.e., connector management agent 45 terminates upgrade upon failure to receive a notification from the cloud calendar connector 50' within a certain time period) or by an explicit notification sent from the cloud calendar connector 50' to the connector management agent 45. At 155, the cloud calendar connector 50' is uninstalled and the original version of the cloud calendar connector software component (i.e., cloud calendar connector 50) is reinstalled at node 40(1) for continued active-active operation with the cloud calendar connector 50 at node 40(2) until the upgrade is re-attempted. At 160, the connector management agent 45 notifies the cloud management service 25 that the upgrade was unsuccessful and the method ends at 165, Returning to 145, if the end-to-end verification was successful, then at 170 the cloud connector 50' notifies connector management agent 45 on node 40(1) of the verification success, thereby indicating that cloud calendar connector 50' is functional. At 175, in response receipt of the notification from the cloud calendar connector 50' indicating that the end-to-end verification was successful, the connector management agent 45 at node 40(1) notifies the cloud connector management service 25 that the upgrade was successful and the method ends at 165

The cloud connector management service 25 is aware of all nodes within cluster 35 and, as noted above, selects an upgrade sequence for a cloud connector type. That is, method 100 illustrates one portion/portion of an upgrade sequence for cluster 35. Therefore, after receiving a notification that the upgrade from cloud calendar connector 50 to cloud calendar connector 50' was successful at node 40(1), cloud connector management service 25 initiates the same upgrade at node 40(2). That is, cloud connector management service 25 re-performs method 100 at node 40(2). The order for upgrading nodes 40(1), 40(2), and/or any other nodes in cluster 35 may be selected at random or may be any order that the cloud connector management service 25 deems to be optimal.

In certain examples, a pre-condition to initiation of an upgrade is a test to ensure that all instances of the connector type that is going to be upgraded are up and running For example, each cloud connector 50, 52, and 54 may be responsible for sending a heartbeat status message to the connector management agent 45. The connector management agent 45 in turn sends a consolidated heartbeat of all connectors on that node to the cloud connector management service 25. This is done at a regular interval (e.g., every 30 seconds) and the cloud connector management service 25 maintains the last-reported state of each connector. As such, the cloud connector management service 25 can examine the state for all connectors of a given type within the specified cluster and determine if all nodes are operational at the time of the request. In an alternative example, prior to an upgrade, the cloud connector management service 25 queries each node (via the connector management agent 45 on the node) for the status of the connector(s) of the specified type(s) prior to initiating the upgrade. In such examples, the cloud connector management service 25 will only proceed with the upgrade if it receives a positive response from each node within a defined (e.g., 30 seconds) period of time. This query mechanism can be retried a finite number of times (e.g., 3) to cope with network instability.

FIG. 1 illustrates an example where only one on-premises cluster 35 is present. It is to be appreciated that multiple clusters each associated with different enterprises may be present in alternative examples. In such examples, each of the clusters may be upgraded in a similar manner as described with reference to FIGS. 1 and 2. It should be appreciated that the cloud 20 may orchestrate upgrades of multiple clusters simultaneously so as to serially upgrade a specific type of cloud connector located within each cluster (i.e., multiple clusters may perform updates simultaneously, but upgrades of a connector within a cluster are performed in a serial/sequential manner). Additionally, as noted, each cluster may run different types of cloud connectors. In accordance with examples presented herein, different types of cloud connectors may be upgraded independent and simultaneously within the same cluster (e.g., cloud calendar connector may be upgraded at the same time as the cloud voicemail connector is upgraded). That is, in contrast to conventional arrangements that require an entire image to upgraded at the same time, the techniques presented herein enable selective and isolated connector upgrades so as not to affect other types of connectors. This provides a "fine-grained" ability to upgrade specific connector types in a seamless manner under the control of the cloud.

In summary, FIGS. 1 and 2 illustrate an example in which connectors in an on-premises cluster are running in an active-active configuration across multiple nodes. Only a single node is upgraded at a time so that the ability to service any inbound or outbound requests while the upgrade is taking place is not affected, thereby enabling a zero-downtime upgrade. In addition, as noted above, the upgrade is sequenced, initiated, and orchestrated by the cloud software in a manner that allows fine-grained control over timing of the upgrade across nodes. Furthermore, the upgrade sequence is done serially per cloud connector type, which means that different types of cloud connectors can be upgraded in parallel.

Figure 3:
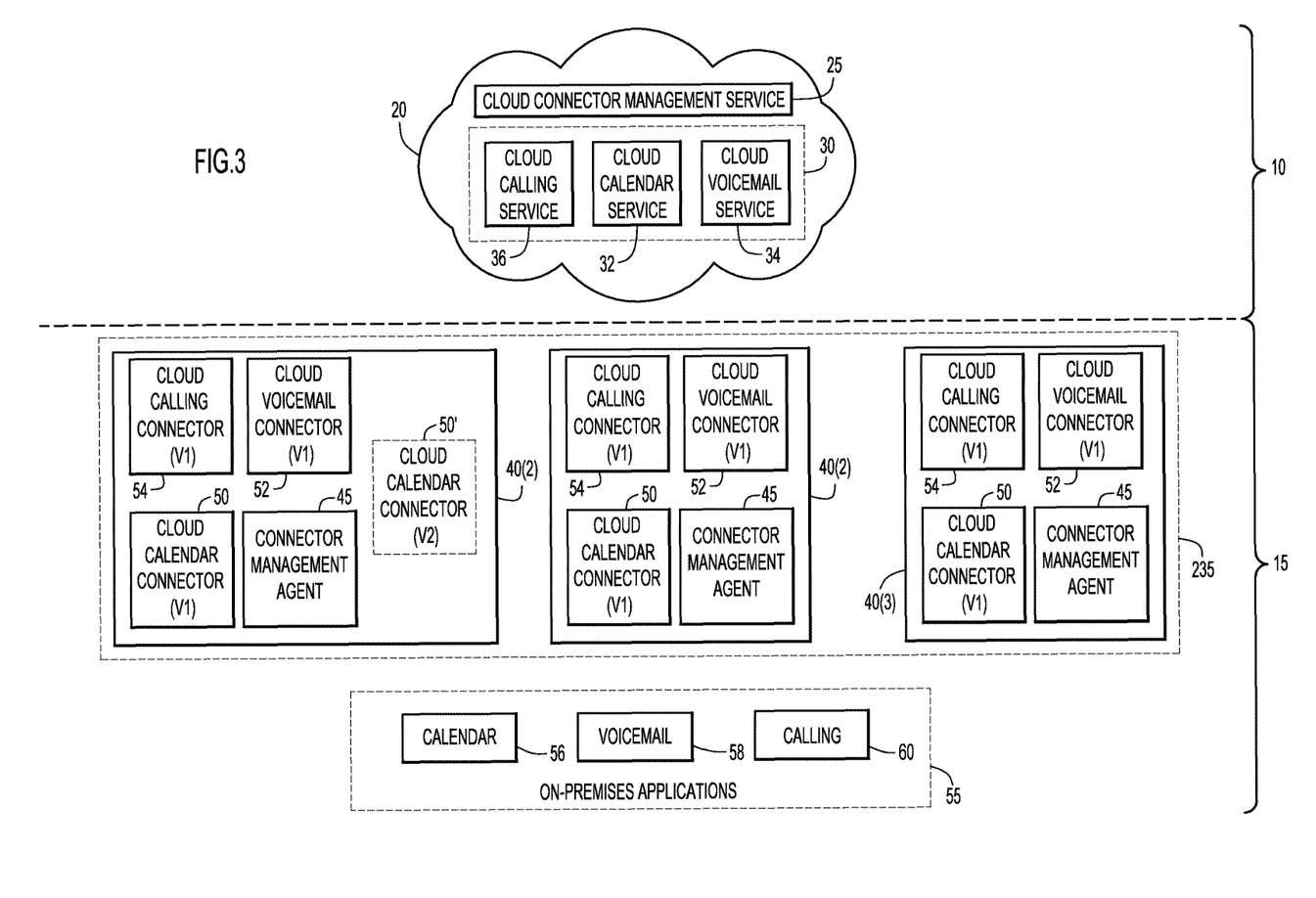
FIG. 3 is block diagram illustrating another arrangement configured to implement cloud-orchestrated upgrade techniques for a cloud connector, according to an example embodiment.

In the example of FIGS. 1 and 2, the different types of cloud connectors operate in an active-active configuration across nodes 40(1) and 40(2). The active-active configuration is present before and after the upgrade, but is not preserved during the upgrade (i.e., only one connector is running during the upgrade). FIG. 3 illustrates an alternative example that uses a re-assignment mechanism to preserve the active-active configuration during the upgrade.

More specifically, FIG. 3 illustrates an arrangement that includes the cloud environment 10 shown in FIG. 1 and an alternative on-premises environment 215 that includes a cluster 235 of nodes 40(1), 40(2), and 40(3). The nodes 40(1), 40(2), and 40(3) have the same arrangement as described above with reference to nodes 40(1) and 40(2) in FIG. 1. That is, the nodes 40(1), 40(2), and 40(3) each include a connector management agent 45 and a plurality of different types of cloud connectors, namely a cloud calendar connector 50, a cloud voicemail connector 52, and a cloud calling connector 54.

As described above, each cloud connector 50, 52, and 54 is associated with one or more on-premises applications 55. FIG. 3 illustrates an example in which the on-premises applications 55 include a calendar application 56, a voicemail application 58, and a calling application 60. In operation, the cloud calendar connector 50 connects the on-premises calendar application 56 to the cloud calendar service 32, the cloud voicemail connector 52 connects the on-premises voicemail application 58 to the cloud voicemail service 34, and the cloud calling connector 54 connects the on-premises calling application 60 to the cloud calling service 36. In addition, as described above, the cloud connectors 50, 52, and 54 connect the on-premises applications 56, 58, and 60 to the respective cloud services 32, 34, and 36.

As described above, FIG. 1 illustrates an arrangement in which there are multiple on-premises nodes (i.e., nodes 40(1), 40(2), and 40(3)) running the same connector types simultaneously. In other words, nodes 40(1), 40(2), and 40(3) simultaneously run the cloud calendar connector 50, the cloud voicemail connector 52, and the cloud calling connector 54. In accordance with the specific example of FIG. 3, the cloud connectors 50, 52, and 54 on nodes 40(1) and 40(2) initially operate in an active-active configuration across the nodes 40(1) and 40(2). That is, in the case where a connector services user subscriptions, each user is assigned to two connectors of the same type for on-premises servicing (each connector running on a different premises node). In the active-active configuration of connectors 50, 52, and 54 across nodes 40(1) and 40(2), both instances of a connector type can act upon a received request. As such, if one instance fails, the second instance can continue servicing requests.

For example, as shown in FIG. 1, a first user (user 1) is subscribed to the on-premises calendar application 56, which is connected to the cloud calendar service 32 via an instance of the cloud calendar connector 50 running on node 40(1) and an instance of the cloud calendar connector 50 running on node 40(2). Similarly, the first user is subscribed to the on-premises voicemail application 58, which is connected to the cloud voicemail service 34 via an instance of the cloud voicemail connector 52 running on node 40(1) and an instance of the cloud voicemail connector 52 running on node 40(2). Additionally, the first user is subscribed to the on-premises calling application 60, which is connected to the cloud calling service 36 via an instance of the cloud calling connector 54 running on node 40(1) and an instance of the cloud calling connector 54 running on node 40(2). For ease of illustration, connections between the on-premises applications, cloud connectors, and cloud services have been omitted from FIG. 3.

FIG. 3 illustrates an active-active with redundancy or active-active with temporary reassignment arrangement where, initially, only nodes 40(1) and 40(2) service subscriptions for the first user (i.e., node 40(3) does not initially service subscriptions for the first user). As described further below with reference to FIG. 4, the example of FIG. 3 is able to preserve the active-active configuration for users while the upgrade is in progress. An additional piece of this variant is the use of a per-node under-subscription of U/N users (assuming a single-node upgrade), where "U" is the number users and "N" is the number of nodes in a cluster.

For example, a single node may service a maximum 10,000 users and there may be a maximum of six (6) nodes in a cluster. In a non-active-active cluster, there is a cluster capacity of U×N (10,000×6) users (i.e., 60,000 users). In an active-active cluster, since a user is duplicated on two nodes, the system can therefore only service N/2 users, for a maximum of 30,000 users in this example. When an upgrade is performed, there is a need to move all 10,000 users from a node (i.e., node 40(1)) to other nodes, which results in two scenarios.

In the first scenario, a single node is reserved for upgrade purposes and, as such, is not assigned any users (i.e., a dedicated upgrade node). As such, the cluster has a cluster capacity of only 50,000 users rather than 60,000 users (i.e., U×(N-1) users) and therefore will omit one node in the assignment step, keeping it as a standby node. This results in a per-cluster under-subscription.

In the second scenario, there is no single node reserved for upgrades and there is an undersubscribing of users to each node in the cluster (i.e., there is no standby). In other words, instead of assigning 10,000 users to each node, the system instead assigned fewer users to each node so that they are able to be assigned more users in the event of an upgrade or failure of another node. A full node's capacity of users is collectively reserved across all nodes, less one in the cluster, where the "less one" is for the node that will be upgraded. For example, in the case of a 6 node cluster and a 10,000 user per node capacity, the system needs to reserve 1,667 slots (10,000/6) slots per node in the cluster, meaning that each node can only service 8,333 users. When one node goes down for upgrade, the 8,333 users are then distributed across the remaining 5 nodes in the cluster, by adding 1,667 users to each node and bringing them, temporarily, up to 10,000 users which is their actual capacity.

Figure 4:
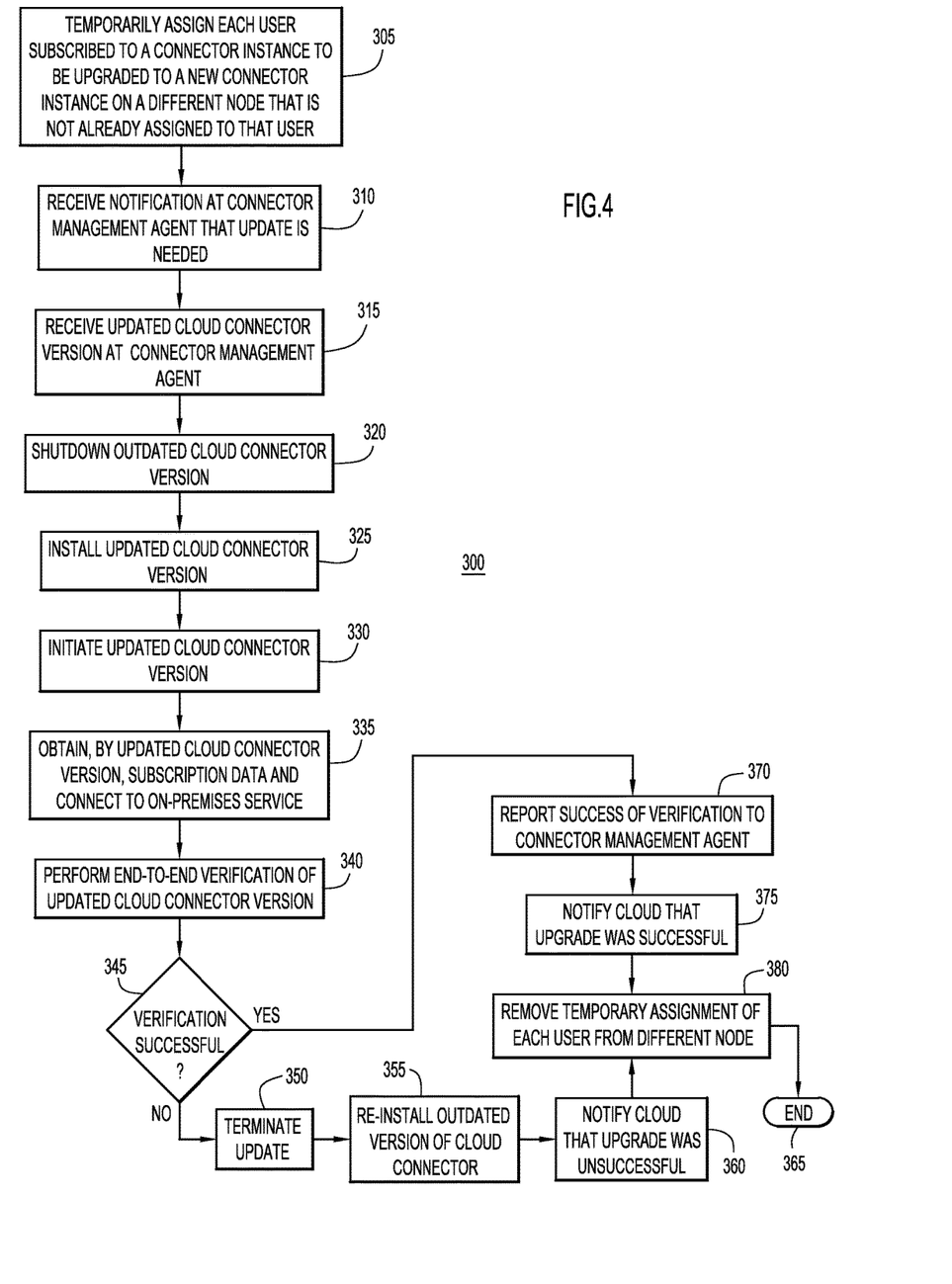
FIG. 4 is a flowchart illustrating another method for performing cloud-orchestrated upgrade techniques for a cloud connector, according to an example embodiment.

FIG. 4 is a detailed flowchart of a method 300 in which the cloud-orchestrated upgrade techniques in accordance with examples presented herein are used to upgrade the first node 40(1) from the current version (version 1) of the cloud calendar connector software component to an updated version (version 2) of the cloud calendar connector software component (i.e., upgrade from cloud calendar connector 50 to cloud calendar connector 50') in a manner that preserves the active-active configuration during the upgrade.

Version 2 of the cloud calendar connector (i.e., cloud calendar connector 50') becomes available in the cloud repository and the cloud connector management service 25 is notified that this new version of the calendar connector is available for a specified premises cluster (i.e., cluster 35). In certain examples, a pre-condition to initiation of an upgrade is a test to ensure that all of the instances of the connector type that is going to be upgraded are up and running This pre-upgrade test may be performed in a similar manner as described above with reference to FIG. 2.

When the upgrade is initiated, the cloud connector management service 25 executes method 300 shown in FIG. 3 for each node in cluster 235. The cloud connector management service 25 sequentially elects each node 40(1), 40(2), and 40(3) for the upgrade process. The upgrade may be initiated from the cloud 20 as a result of manual administrative intervention at the cloud, automatically initiated at a scheduled time by the cloud connector management service 25 (i.e., a scheduled upgrade), etc. Similar to the example of FIG. 2, the order for upgrading nodes 40(1), 40(2), 40(3), and/or any other nodes in cluster 235 may be selected at random or may be any order that the cloud connector management service 25 deems to be optimal.

Similar to the example of FIG. 2, the upgrade shown in FIG. 4 may be initiated in different manners, but the upgrade is orchestrated, controlled, and otherwise managed by cloud 20. Method 300 begins at 305 where each user subscribed to a connector instance to be upgraded is assigned to a new connector instance on a different node that is not already assigned to that user. Therefore, at least temporarily, there are three connector instances servicing the user in an active-active-active configuration. In the specific example of FIG. 4, cloud calendar connector 50 at node 40(1) is being upgraded. As such, the first user (any other users), who is assigned to cloud calendar connector 50 at node 40(1), is also assigned to cloud calendar connector 50 at node 40(3). Cloud calendar connectors 50 at nodes 40(1), 40(2), and 40(3) run in an active-active-active configuration.

When a cluster initiates upgrade operations, the cloud management service 25 selects a node from the cluster to upgrade and retrieves a list of assigned users for the connector type to be upgraded on that node. The cloud management service 25 then executes an assignment algorithm on each of those users. This means that the cloud management service 25 will select, from amongst the remaining nodes in the cluster that do not already service the given user, a new node to which to assign the user, and assign the user to the connector on the selected node. Since, in this example, (1) the users are already assigned on node 40(1), (2) the nodes within a cluster are configured the same way from a network connectivity perspective, and (3) the cloud receive regular heartbeat status from each connector, it can be determined that any connector node within the cluster can service the user, and therefore there is no need to test this as in the case in an initial discovery and assignment flow.

At 310, the connector management agent 45 on node 40(1) receives a notification that an update to the cloud calendar connector 50 is required. At 315, the updated version of the cloud connector (i.e., cloud connector 50') is received at the connector management agent 45.

As described with reference to FIGS. 1 and 2, in one example of FIG. 2, connector management agent 45 periodically sends a heartbeat message (e.g., a HTTP POST request) to cloud connector management service 25. Upon receipt of a heartbeat message, the cloud connector management service 25 sends a response (e.g., a POST response) that includes information indicating a version of the cloud connector that node 40(1) should be running. The connector management agent 45 compares an actual version of the cloud connector running on the node 40(1) against the version advertised in the in POST response. If there is a difference, the connector management agent 25 will use an HTTPS link in the POST response to download a new version of the connector from a repository in the cloud 20. In alternative examples, the above heartbeat mechanism using HTTP may be replaced with WebSockets or another communication mechanism.

At 320, the outdated version of the calendar cloud connector (i.e., cloud calendar connector 50) is deactivated at node 40(1). As noted above, since the cloud calendar connectors 50 at nodes 40(1), 40(2), and 40(3) are running in an active-active-active configuration across nodes 40(1), 40(2), and 40(2), the cloud calendar connectors 50 at nodes 40(2) and 40(3) continue to operate in an active-active configuration. In other words, in contrast to the example of FIG. 3, there are still two nodes servicing the first user while cloud calendar connector 50 at node 40(1) is upgraded.

At 325, connector management agent 45 installs cloud calendar connector 50' on the node 40(1) and, at 330, cloud calendar connector 50' is initiated/started. At 335, the cloud calendar connector 50' obtains data for user subscriptions to the on-premises application corresponding to the cloud calendar service 32. In the example of FIG. 1, the cloud calendar connector 50' obtains data for the subscription of the users to the on-premises calendar application 56. The subscription data may be obtained, for example, from the connector management agent 45 or the cloud connector management service 25. Also at 335, the cloud calendar connector 50' connects with the on-premises calendar application 56, providing a flow of events from the on-premises calendar application 56 to the cloud calendar service 32.

At 340, after cloud calendar connector 50' starts up, the updated version of the cloud calendar connector software component performs an end-to-end verification of itself. As noted above, the cloud calendar connector operates with both the cloud 20 and the on-premises calendar application 56. Therefore, end-to-end verification means that the cloud calendar connector 50' has confirmed that it can communicate with both the cloud 20 and the on-premises calendar application 56 (i.e., tests the cloud connection and the local connection). At 345, the cloud calendar connector 50' determines if the end-to-end verification was successful.

If the end-to-end verification was unsuccessful, then the upgrade to cloud calendar connector 50' is terminated at 350. Unsuccessful end-to-end verification can be identified by a time-out (i.e., connector management agent 45 terminates upgrade upon failure to receive a notification from the cloud calendar connector 50' within a certain time period) or by an explicit notification sent from the cloud calendar connector 50' to the connector management agent 45. At 355, the cloud calendar connector 50' is uninstalled and the original version of the cloud calendar connector software component (i.e., cloud calendar connector 50) is reinstalled at node 40(1) for continued active-active operation with the cloud calendar connector 50 at node 40(2) until the upgrade is re-attempted. At 360, the connector management agent 45 notifies the cloud management service 25 that the upgrade was unsuccessful. At 380, each temporary user subscription to the cloud calendar connector 50 at node 40(3) is terminated (i.e., remove assignment of users to the cloud calendar connector 50 at node 40(3)). As result, the arrangement re-enters an active-active configuration across nodes 40(1) and 40(2). The method then ends at 365.

Returning to 345, if the end-to-end verification was successful, then at 370 the cloud calendar connector 50' notifies connector management agent 45 on node 40(1) of the verification success, thereby indicating that cloud calendar connector 50' is functional. Once cloud calendar connector 50' is active, the cloud calendar connector 50' at node 40(1) runs in an active-active-active configuration with cloud connectors 50 at nodes 40(2) and 40(3). In other words, the active-active-active configuration includes one updated version of the cloud calendar connector in parallel with two outdated versions of the cloud calendar connector.

At 375, in response receipt of the notification from the cloud calendar connector 50' indicating that the end-to-end verification was successful, the connector management agent 45 at node 40(1) notifies the cloud connector management service 25 that the upgrade was successful. At 380, each temporary user subscription to the cloud calendar connector 50 at node 40(3) is terminated (i.e., remove assignment of users to the cloud calendar connector 50 at node 40(3)). As result, the arrangement re-enters an active-active configuration across nodes 40(1) and 40(2). The method then ends at 365.

When the method ends, regardless of success or failure, the cloud management agent performs an unassignment of users from the 3rd node in the active-active-active configuration, reverting back to an active-active configuration (i.e., step 380 in the flow occurs regardless of success or failure).

The cloud connector management service 25 is aware of all nodes within cluster 235 and, as noted above, selects a sequence for upgrade sequence for a cloud connector type. Therefore, after receiving a notification that the upgrade from cloud calendar connector 50 to cloud calendar connector 50' was successful at node 40(1), cloud connector management service 25 initiates the same upgrade at nodes 40(2) and 40(3) in accordance with a predetermined upgrade sequence.

In summary, FIGS. 3 and 4 illustrate an arrangement for upgrading active-active nodes with temporary reassignment of subscriptions during a cloud connector upgrade.

Figure 5:
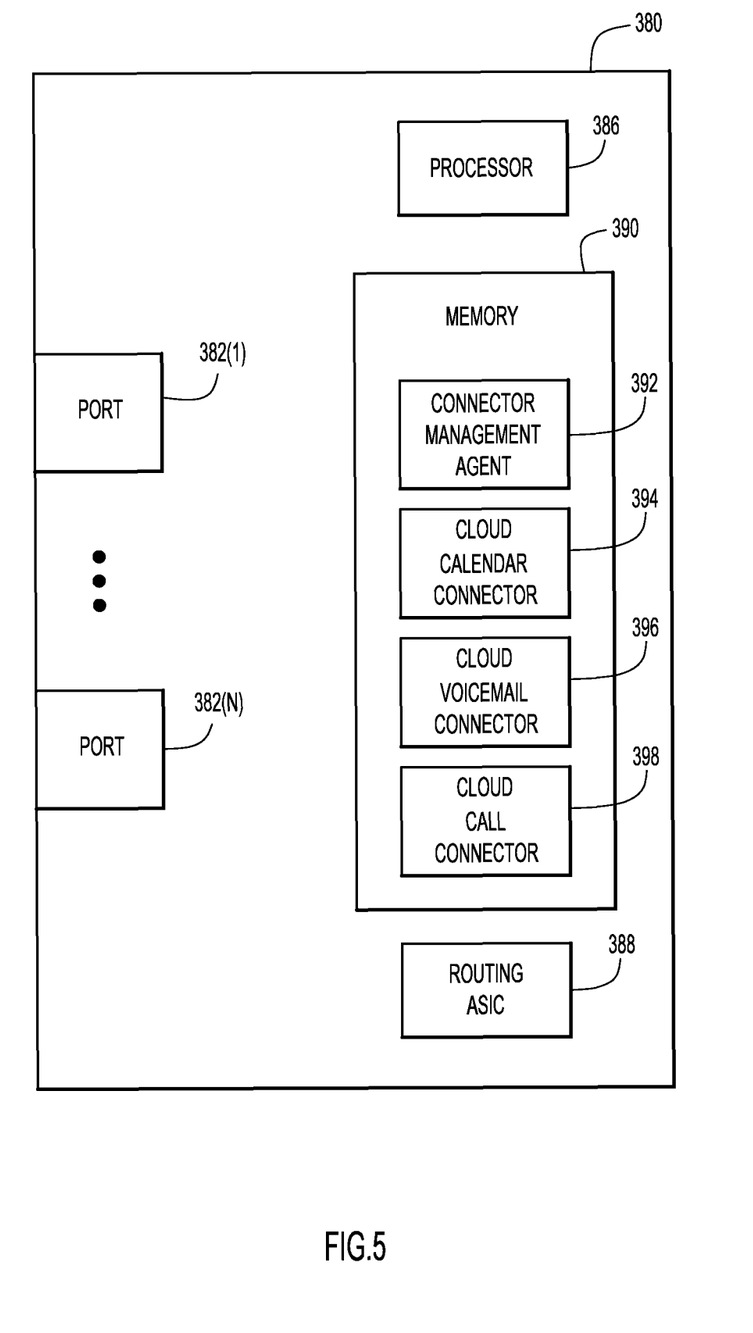
FIG. 5 is a block diagram of an on-premises node configured to implement zero cloud-orchestrated upgrade techniques for a cloud connector, according to an example embodiment.

FIG. 5 is a block diagram of an on-premises node 380 configured to implement the cloud-orchestrated upgrade techniques in accordance with examples presented herein. As noted above, on-premises nodes in accordance with examples presented herein may have a number of different arrangements. Merely for ease of illustration, FIG. 5 illustrates an arrangement in which the on-premises node is a basic router.

In the example of FIG. 5, the router 380 comprises a plurality of ports 382(1)-384(N), a processor 386, a routing application specific integrated circuit (ASIC) 388, and a memory 390. The routing ASIC 388 is a hardware device that performs various packet forwarding/routing operations. Memory 390 stores instructions for one or more software modules including a connector management agent 392, a cloud calendar connector 394, a cloud voicemail connector 396, and a cloud calling connector 398.

The memory 390 may be read only memory (ROM), random access memory (RAM), magnetic disk storage media devices, optical storage media devices, flash memory devices, electrical, optical, or other physical/tangible memory storage devices. Thus, in general, the memory 390 may comprise one or more tangible (non-transitory) computer readable storage media (e.g., a memory device) encoded with software comprising computer executable instructions and when the software is executed (by the processor 386) it is operable to perform the operations described herein. In particular, the router 380 is configured to perform the operations described above in connection with FIGS. 1-4 when executing the software stored in memory 390.

Figure 6:
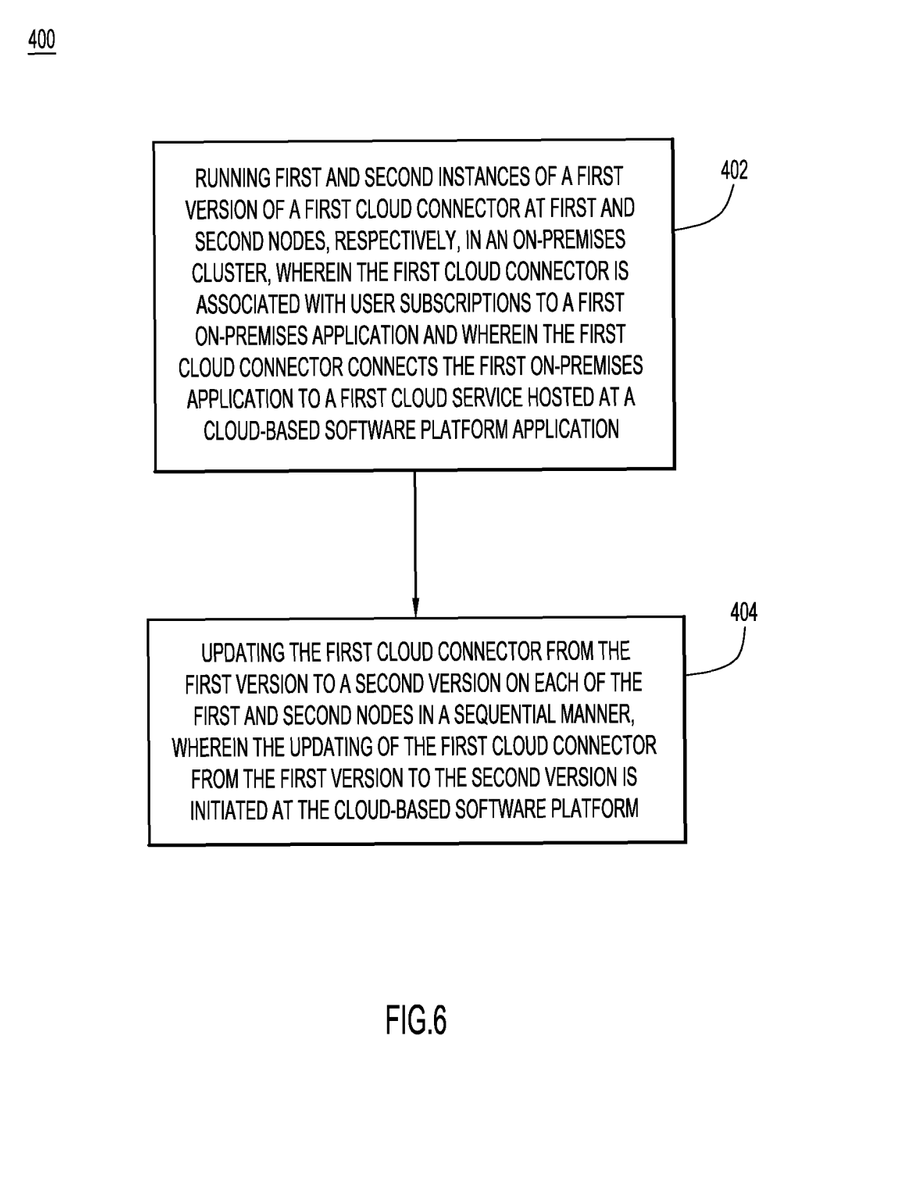
FIG. 6 is a high level flowchart of a method for performing cloud-orchestrated upgrade techniques for a cloud connector, according to an example embodiment.

FIG. 6 is a high level flowchart of a method 400 in accordance with examples presented herein. Method 400 begins at 402 where a first version of a first cloud connector is running in an active-active configuration across first and second nodes in an on-premises cluster. The first cloud connector is associated with subscriptions of a first cloud service hosted at a cloud-based software platform to a first on-premises application. At 404, the first cloud connector is updated from the first version to a second version on each of the first and second nodes in a sequential manner. The update of the first cloud connector from the first version to the second version is initiated at the cloud-based software platform.

As described above, presented herein are techniques that use an active-active configuration to enable cloud-orchestrated upgrades of cloud connectors running in an on-premises cluster. The cloud-based control of the upgrade operates with zero intervention by an on-premises administrator, allowing for an upgrade to span across multiple clusters and multiple organizations/companies/locations in parallel. That is, the sequencing and orchestration of the upgrade is done by the cloud and the premises has no control over timing, etc. In accordance with examples presented herein, the upgrades are performed serially per connector type (calling connector, voicemail connector, calendar connector, etc.). However, multiple connector types can be upgraded at same time.

The techniques presented herein have been described with reference to updating cloud connectors/extensions. However, it is to be appreciated that the techniques presented herein may be used to update/upgrade any software product that connects premise components to cloud components and has the need for zero-downtime upgrades and high availability.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
running first and second instances of a first version of a first cloud connector at first and second nodes, respectively, in an on-premises cluster, wherein the first cloud connector is associated with user subscriptions to a first on-premises application and wherein the first cloud connector connects the first on-premises application to a first cloud service hosted at a cloud-based software platform application; and
updating, at the first node, the first cloud connector from the first version to a second version;
performing end-to-end verification of the second version of the first cloud connector at the first node, wherein the end-to-end verification is configured to confirm that the second version of the cloud connector can communicate with both the first cloud service and the first on-premises application,
wherein the updating of the first cloud connector from the first version to the second version is initiated at the cloud-based software platform.

2. The method of claim 1, wherein updating the first cloud connector from the first version to a second version at the first node includes:
receiving, at the first node, the second version of the first cloud connector from the cloud-based software platform,
deactivating the first version of the first cloud connector;
installing and initializing the second version of the first cloud connector at the first node.

3. The method of claim 2, further comprising:
temporarily re-assigning a subscription associated with the first cloud connector at the first node to an instance of the first cloud connector at a third node in the on-premises cluster during upgrade of the first cloud connector at the first node from the first version to the second version.

4. The method of claim 1, further comprising: at the second node, updating the second cloud connector from the first version to the second version.

5. The method of claim 4, wherein a sequence for updating the first cloud connector at each of the first and second nodes is determined by the cloud-based software platform.

6. The method of claim 1, further comprising:
determining that the end-to-end verification was successful such that that the second version of the first cloud connector can communicate with both the first cloud service and the first on-premises application; and
notifying the cloud-based software platform that second version of the first cloud connector is active at the first node.

7. The method of claim 1, further comprising:
determining that the end-to-end verification was unsuccessful such that the second version of the first cloud connector cannot communicate with at least one of the first cloud service or the first on-premises application;
uninstalling the second version of the first cloud connector;
reinstalling and reinitializing the first version of the first cloud connector; and notifying the cloud-based software platform that the upgrade to the second version of the first cloud connector was unsuccessful.

8. The method of claim 1, further comprising:
running a first version of a second cloud connector at the first and second nodes, respectively, in the on-premises cluster, wherein the second cloud connector is associated with subscriptions of a second on-premises application and wherein the second cloud connector connects the second on-premises application to a second cloud service hosted at the cloud-based software platform; and
updating the second cloud connector from the first version to a second version on each of the first and second nodes in a sequential manner,
wherein the updating of the first cloud connector from the first version to the second version of the first cloud connector and the update of the second cloud connector from the first version to the second version of the second cloud connector occur simultaneously in the on-premises cluster.

9. The method of claim 1, wherein the first and second instances of the first version of the first cloud connector run in an active-active configuration across the first and second nodes.

10. The method of claim 1, further comprising:
prior to updating the first cloud connector from the first version to the second version on the first node, performing an upgrade test to ensure that all of the instances of the first cloud connector are running on the first and second nodes.

11. An apparatus in an on-premises cluster, comprising:
at least one network interface port;
a memory; and
a processor configured to:
run a first instance of a first version of a first cloud connector, wherein the first cloud connector is associated with user subscriptions to a first on-premises application, the first cloud connector connects the first on-premises application to a first cloud service hosted at a cloud-based software platform application, and a second instance of the first version of the first cloud connector also runs at a second apparatus in the on-premises cluster,
receive a second version of the first cloud connector from the cloud-based software platform,
deactivate the first version of the first cloud connector,
install and initialize the second version of the first cloud connector at the first node, and
perform end-to-end verification of the second version of the first cloud connector at the first node, wherein the end-to-end verification is configured to confirm that the second version of the cloud connector can communicate with both the first cloud service and the first on-premises application.

12. The apparatus of claim 11, wherein the processor is configured to:
transfer a subscription associated with the first instance of the first cloud connector to an instance of the first cloud connector at a third apparatus in the on-premises cluster during upgrade of the first cloud connector from the first version to the second version.

13. The apparatus of claim 11, wherein the processor is configured to:
determine that the end-to-end verification was successful such that that the second version of the first cloud connector can communicate with both the first cloud service and the first on-premises application; and
notify the cloud-based software platform that second version of the first cloud connector is active at the first node.

14. The apparatus of claim 11, wherein the processor is configured to:
determine that the end-to-end verification was unsuccessful such that the second version of the first cloud connector cannot communicate with at least one of the first cloud service or the first on-premises application;
uninstall the second version of the first cloud connector;
reinstall and reinitializing the first version of the first cloud connector; and
notify the cloud-based software platform that the upgrade to the second version of the first cloud connector was unsuccessful.

15. One or more non-transitory computer readable storage media encoded with instructions that, when executed by one or more processors, cause the one or more processors to:
run first and second instances of a first version of a first cloud connector at first and second nodes, respectively, in an on-premises cluster, wherein the first cloud connector is associated with user subscriptions to a first on-premises application and wherein the first cloud connector connects the first on-premises application to a first cloud service hosted at a cloud-based software platform application; and
update, at the first node, the first cloud connector from the first version to a second version;
perform end-to-end verification of the second version of the first cloud connector at the first node, wherein the end-to-end verification is configured to confirm that the second version of the cloud connector can communicate with both the first cloud service and the first on-premises application,
wherein the updating of the first cloud connector from the first version to the second version is initiated at the cloud-based software platform.

16. The non-transitory computer readable storage media of claim 15, wherein updating the first cloud connector from the first version to a second version at the first node includes instructions that, when executed by one or more processors, cause the one or more processors to:
receive, at the first node, the second version of the first cloud connector from the cloud-based software platform,
deactivate the first version of the first cloud connector;
install and initialize the second version of the first cloud connector at the first node.

17. The non-transitory computer readable storage media of claim 16, further comprising instructions that, when executed by one or more processors, cause the one or more processors to:
temporarily re-assign a subscription associated with the first cloud connector at the first node to an instance of the first cloud connector at a third node in the on-premises cluster during upgrade of the first cloud connector at the first node from the first version to the second version.

18. The non-transitory computer readable storage media of claim 15, further comprising instructions that, when executed by one or more processors, cause the one or more processors to:
determine that the end-to-end verification was successful such that that the second version of the first cloud connector can communicate with both the first cloud service and the first on-premises application; and notify the cloud-based software platform that second version of the first cloud connector is active at the first node.

19. The non-transitory computer readable storage media of claim 15, further comprising instructions that, when executed by one or more processors, cause the one or more processors to:

determine that the end-to-end verification was unsuccessful such that the second version of the first cloud connector cannot communicate with at least one of the first cloud service or the first on-premises application;

uninstall the second version of the first cloud connector;

reinstall and reinitializing the first version of the first cloud connector; and notify the cloud-based software platform that the upgrade to the second version of the first cloud connector was unsuccessful.

20. The non-transitory computer readable storage media of claim 15, wherein the first and second instances of the first version of the first cloud connector run in an active-active configuration across the first and second nodes.

21. The non-transitory computer readable storage media of claim 15, further comprising instructions that, when executed by one or more processors, cause the one or more processors to:

prior to updating the first cloud connector from the first version to the second version on the first node, perform an upgrade test to ensure that all of the instances of the first cloud connector are running on the first and second nodes.

* * * * *